(12) United States Patent
Wortberg

(10) Patent No.: US 9,025,292 B2
(45) Date of Patent: May 5, 2015

(54) APPARATUS AND METHOD FOR THE INTELLIGENT PROTECTION OF AN ELECTRICAL LEAD

(71) Applicant: Lisa Dräxlmaier GmbH, Vilsbiburg (DE)

(72) Inventor: Michael Wortberg, Dorfen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 58 days.

(21) Appl. No.: 13/894,012

(22) Filed: May 14, 2013

(65) Prior Publication Data

US 2013/0321960 A1 Dec. 5, 2013

(30) Foreign Application Priority Data

May 15, 2012 (DE) .................... 10 2012 208 115

(51) Int. Cl.
*H02H 5/04* (2006.01)
*H02H 1/00* (2006.01)
*H02H 9/02* (2006.01)

(52) U.S. Cl.
CPC ............. *H02H 1/0007* (2013.01); *H02H 9/025* (2013.01)

(58) Field of Classification Search
USPC ........................................................ 361/93.8
See application file for complete search history.

(56) References Cited

U.S. PATENT DOCUMENTS

| | | | |
|---|---|---|---|
| 2008/0112131 A1* | 5/2008 | Artman et al. | 361/687 |
| 2009/0024345 A1* | 1/2009 | Prautzsch | 702/99 |
| 2009/0087725 A1* | 4/2009 | Sim | 429/90 |
| 2009/0129432 A1* | 5/2009 | Luniewski | 374/100 |
| 2009/0202890 A1* | 8/2009 | Takeda et al. | 429/62 |
| 2010/0315752 A1* | 12/2010 | Rabu et al. | 361/103 |
| 2011/0080681 A1* | 4/2011 | Maruyama et al. | 361/93.8 |
| 2011/0141635 A1* | 6/2011 | Fabian | 361/45 |
| 2011/0194223 A1 | 8/2011 | Kang et al. | |

* cited by examiner

*Primary Examiner* — Scott Bauer

(74) *Attorney, Agent, or Firm* — Finnegan, Henderson, Farabow, Garrett & Dunner LLP

(57) ABSTRACT

An apparatus for protecting an electrical lead in a vehicle. The apparatus includes a temperature sensor configured to detect a temperature value of a conductor path coupled electrically to the electrical lead and a current limitation unit configured to limit a current flowing through the electrical lead when the temperature value of the conductor path exceeds a predetermined value.

18 Claims, 5 Drawing Sheets

APPARATUS AND METHOD FOR THE INTELLIGENT PROTECTION OF AN ELECTRICAL LEAD

CROSS-REFERENCE TO RELATED APPLICATIONS

This application claims the benefit of priority of German Patent Application No. 102012208115.1, filed May 15, 2012, the entire content of which is incorporated herein by reference.

TECHNICAL FIELD

The present invention relates to an apparatus and a method for the protection of an electrical lead in a vehicle, and in particular an apparatus and a method for the protection of an electric fuse by means of an indirect temperature measurement.

BACKGROUND

The fusing of an electrical lead in a vehicle is usually implemented by means of a safety fuse which is typically designed for uniform loading of the electrical lead. Temporary pulse loads which are characterized by large current peaks are, however, particularly bad for the life span of a fuse because under certain circumstances these do not constitute a problem for the electrical lead, but can strain the fuse because the pulse loads come close to the actual triggering conditions such that more frequently recurring pulse loads reduce the life span of the fuse, and so the fuse ages under load peaks. If, for example, fuses melt within a range of 40-50 A, repeated current peaks in the range over 30 A lead to wear and ageing of the fuse. Consequently, inherent over-dimensioning occurs because the characteristics of the safety fuse and the lead are not matched to one another, and so the electric fuses are typically designed for larger currents and the dimensions of the electrical lead are also matched to this, and so greater consumption of materials and resources occurs.

One example of this poor matching between the safety fuse and the electrical lead is the protection of a motor with a nominal output of 140 W/12 A. Since the motor draws an initial current which exceeds the nominal current six-fold, it can not be protected with a 15 A fuse although the electrical lead could carry this pulse load. The consequence is that a larger fuse (for example in the range of 30 A to 40 A) and so an electrical lead with a larger cross-section has to be chosen (4 mm$^2$).

A further aspect of this problem of matching the safety fuse and the electrical lead relates to thermal loads. While for short load peaks in the lead the flow of heat through the ohmic losses introduced is buffered by the large heat capacity of the electrical lead, the triggering range of the fuse is a "constriction" with a small heat capacity. Therefore, the fuse is greatly heated by the load peaks, and this can lead to ageing and faulty triggering.

For long-lasting, almost stationary overload situations with a low excess current, e.g. with 135% nominal current, the triggering range of the safety fuse can release its lost heat via the terminal lugs such that it takes several 1000 s before the fuse is triggered. The electrical lead can heat up, however, by 100° C. so that damage to the electrical lead can not be ruled out. It is therefore a technical object to provide intelligent protection for an electrical lead so that heating up of the electrical lead beyond a specific temperature can be avoided.

In the prior art circuits for this type of intelligent protection are known in which the load current is measured and averaged by means of smart MOSFETs (PROFETs). The temperature of the lead is then determined from an I2 t lost energy integration from the current profile by means of a software model. However, in comparison to normal MOSFETs, smart MOSFETs (Profets) are expensive components. Alternatively, standard MOSFETs can be used, the current of the electric conductor over the drop in voltage being measured by means of a shunt resistance or by means of the on-resistance (Rdson) of the MOSFET, but comparably expensive differential amplifiers are also required for this circuit.

SUMMARY

Therefore, the object underlying the invention is to provide a less expensive apparatus for the intelligent protection of an electrical lead in a vehicle.

This object is achieved by an apparatus for the protection of an electrical lead in the on-board power supply of a vehicle having the features of Claim 1, by an electric load switch having the features of Claim 12, and by a method for the protection of an electrical lead having the features of Claim 13. Advantageous embodiments are described in the sub-claims.

According to one embodiment the apparatus for the protection of an electrical lead in a vehicle comprises a temperature sensor that is designed to detect a temperature value of a conductor path that is coupled electrically to the electrical lead; and a limitation unit that is designed to limit a current flow through the electrical lead when the detected temperature value of the electric conductor path exceeds a predetermined value.

With this apparatus, therefore, it is not the current of the electric conductor that is measured, but the heating of a conductor path, from which the current in the electrical lead can be suitably limited, eliminated or interrupted by means of inexpensive components.

According to one advantageous embodiment the conductor path has thermal characteristics matched to the electrical lead. As used in the disclosure, the word "match" may refer to substantially in conformance, suit, or adapt, but does not require identical matching. By means of this thermal matching the heat input due to ohmic losses in the electrical lead and the heat discharge from the electrical lead with a heat input due to ohmic losses in the conductor path and the heat discharge of the latter from the conductor path are matched so that the thermal state of the electric conductor can be determined very accurately by indirectly detecting the temperature of the conductor path.

According to a further advantageous embodiment the conductor path has dimensions and/or a heat capacity which are matched to the dimensions and/or heat capacity of the electrical lead. Therefore, the heat input due to ohmic losses and the heat discharge away from the conductor path and the electrical lead can be matched precisely to one another.

According to a further advantageous embodiment the conductor path has a section with a taper (constriction) so that this section is tapered in comparison to the dimensions of the electric conductor, in particular nominal dimensions according to the current load capacity of the electrical lead. Therefore, by means of the taper one can accurately set a heat discharge or heat capacity of the conductor path that corresponds to the heat discharge or heat capacity of the electrical lead. Therefore the conductor path and the electrical lead have a comparable thermal balance and the temperature of the electrical lead can be determined very accurately by means of the temperature measured at the constriction. For this purpose the taper has dimensions, for example, such that the quotient of the heat capacity and resistance (lost power input) corresponds approximately to the quotient of the heat capacity per unit length and resistance per unit length of the lead.

According to a further advantageous embodiment a drop in voltage over the constriction of the conductor path can be used for a trip-out. Therefore a trip-out can be implemented with a very low-ohm short circuit, in particular when the temperature measurement is too slow for a cut-out.

According to a further advantageous embodiment the temperature sensor is a temperature-dependent resistor which is in thermal contact with the conductor path. Therefore the temperature sensor can be provided by a comparably inexpensive component that enables good thermal contact with the conductor path.

According to a further advantageous embodiment the temperature-dependent resistor is part of a voltage divider which has a further resistor connected to earth and the temperature-dependent resistor is electrically connected to the conductor path and a voltage value between the temperature-dependent resistor and the further resistor of the voltage divider is conveyed to the limitation unit. Therefore, the current through the electric conductor is also connected directly to the apparatus for protection, and a simple supply of power to the apparatus is produced.

According to a further advantageous embodiment the apparatus further comprises a switch, in particular a power MOSFET, which limits the power supply through the electrical lead in response to a signal from the limitation unit when the detected temperature value of the electric conductor path exceeds the predetermined value. Therefore, the apparatus is characterized by an inexpensive semiconductor switch.

According to a further advantageous embodiment the limitation unit is furthermore designed to open the switch again when the detected temperature value of the electric conductor path falls below the predetermined value again and/or an active reset is implemented for example by a user and/or a control. Therefore complex maintenance work on the on-board vehicle power supply is, moreover, avoided.

According to a further advantageous embodiment the apparatus for the protection of an electrical lead further comprises an A/D converter which receives a signal from the temperature sensor and converts it into a digital signal for the limitation unit. Therefore a digital signal can be supplied to the limitation unit with which the limitation unit can carry out further control and calculation operations.

Moreover, in particular connected to the limitation unit, an evaluation unit can be provided which, for example, determines and evaluates a drop in voltage at the taper of the lead or the conductor path and on the basis of a result brings about a current limitation by means of the current limitation unit. Therefore a fused separation of the load line can be achieved with low-ohm short circuits, in particular when the reaction time with just one temperature measurement is too long.

In a further advantageous embodiment provision can be made such that the evaluation is made with a set threshold by means of a comparator.

According to a further advantageous embodiment the conductor path is a conductor path printed onto a board. Therefore the apparatus is in the form of a compact component.

Preferably a glass epoxy (FR4) board or a metal core board (IMS) is used as the material for a board or as a circuit carrier.

According to a further advantageous embodiment the conductor path, the limitation unit, the temperature sensor and/or the switch are applied to a board. Therefore, all of the components of the apparatus are in direct thermal contact, by means of which improved determination of the temperature of the electric conductor is achieved.

According to another embodiment an electric load switch with an electric protection function for the protection of an electrical lead to consumers comprises the apparatus described above which is applied to a board.

According to another embodiment a method for the protection of an electrical lead in a vehicle comprises the steps of: detecting a temperature value of a conductor path which is coupled electrically to the electrical lead; and limiting a current flow through the electrical lead when the detected temperature value of the electric conductor path exceeds a predetermined value.

Further advantageous features of the invention are disclosed in the detailed description of the embodiments and in the claims.

BRIEF DESCRIPTION OF THE DRAWINGS

In the following the invention is described in detail by means of the attached drawings.

DETAILED DESCRIPTION OF THE EMBODIMENTS

Preferred embodiments of the present invention are described in detail below with reference to the accompanying drawings. Here, the same or corresponding elements in different drawings are respectively identified by the same or similar reference numbers.

The preferred embodiments of the invention, which are described in detail below, are described in detail with regard to an apparatus for the protection of an electrical lead in a vehicle on-board power supply. It is noted, however, that the following description only contains examples, and should not be considered as restricting the invention.

Figure 1:
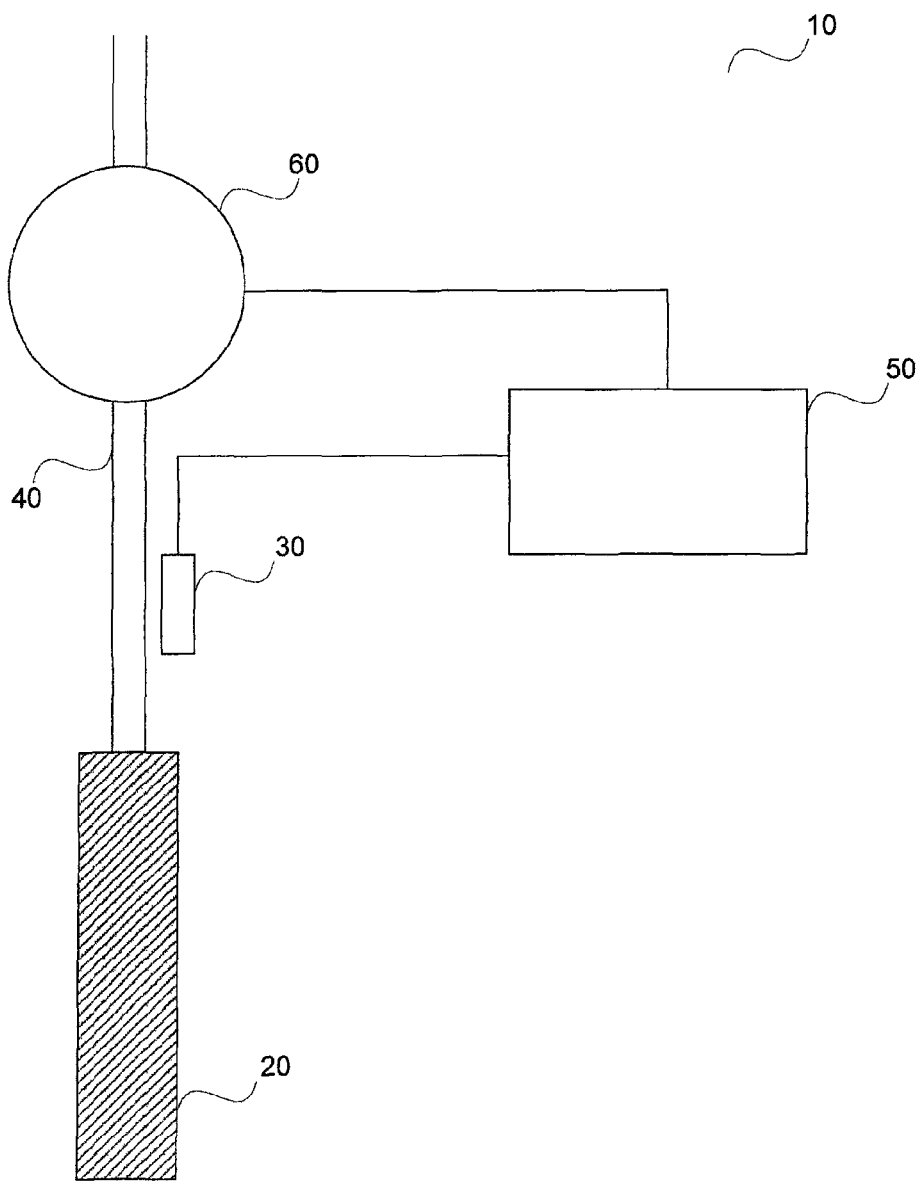
FIG. 1 shows schematically an apparatus for the protection of an electrical lead in a vehicle according to one embodiment.

FIG. 1 schematically shows elements of an apparatus 10 for the protection of the electrical lead 20 in a vehicle. The apparatus comprises a temperature sensor 30, a limitation unit 50, a conductor path 40 and a switch 60, the temperature sensor 30 being connected to the limitation unit 50 for the transmission of signals, the limitation unit 50 being connected to the switch for the transmission of signals, and the temperature sensor 30 close to the conductor path 40 being arranged in thermal contact with the latter in order to detect the temperature of the conductor path 40.

The conductor path 40 is coupled electrically to the electrical lead 20 to be fused so that an electric current through the electrical lead 20 to be fused, which supplies consumers in the vehicle on-board power supply, also flows through the conductor path 40. Furthermore, the electrical lead is a lead which, for example, can be laid in the vehicle as part of a wiring harness or free from multi-tracks so as, for example, to connect a vehicle battery in part of the vehicle to an electric consumer in the on-board power supply in another part of the vehicle.

The conductor path 40 differs from the electrical lead in that the latter is used for the electrical connection on a conductor board or in individual or integrated circuits.

The electric coupling between the electrical lead 20 and the conductor path 40 can therefore take place on a conductor board by the electrical lead being fastened to the circuit board, for example with a clamp or similar, so that a flow of current through the electric conductor 20 to be protected and the conductor path 40 can take place.

The temperature sensor 30 is designed to detect a temperature value of the conductor path 40. The temperature sensor 30 is arranged on the conductor path 40 so that the temperature sensor can detect a temperature of the conductor path 40. The temperature sensor 30 is preferably connected electrically to the conductor path 40 so that the current flowing over it is measured and evaluated by the limitation unit 50.

The protection principle of this embodiment therefore consists of measuring not a current of the electrical lead, but the heating on the conductor path 40 in order to determine the lead temperature.

The limitation unit 50 is connected to the temperature sensor 30 here and receives a signal from the temperature sensor 30 that displays a detected temperature of the conductor path 40.

The limitation unit 50 is designed here to limit a current flow through the electrical lead 20 when the detected temperature value of the electric conductor path 40 exceeds a predetermined value.

The limitation of the current flow through the electrical lead 20 is implemented here by the switch 60, the switch being able to assume at least two states—a first state with a first resistance and a second state with a second resistance, the second resistance being higher than the first resistance.

Therefore, the limitation unit 50 can activate the switch 60 so that the latter assumes the second state and the current flow through the electric conductor 20 and the conductor path 40 is limited such that no further increase in temperature of the electric conductor 20 takes place. In particular, the second state of the switch 60 can lead to a cut-off of the current flow through the electric conductor so that the lead can cool down again.

Thus, in one embodiment the limitation unit 50 has a comparison unit which compares a detected temperature value of the temperature sensor 30 with a previously determined value, and when the previously determined value is exceeded generates a signal that is delivered to the switch 60 in order to switch the latter from the first into the second state.

In one preferred embodiment the conductor path 40 has thermal characteristics matched to the thermal characteristics of the electrical lead 20 to be protected. From this thermal matching the heat input due to ohmic losses in the electrical lead 20 is directly connected to a heat input due to ohmic losses in the conductor path 40 so that the thermal state of the electric conductor 20 can be determined very accurately by indirectly detecting the temperature of the conductor path 40. Therefore, the change to the temperature $\Delta T_{LB}$ of the conductor path can be determined very accurately by means of an indirect temperature measurement $\Delta T_{sensor}$ by the temperature sensor 30, and so the temperature of the electrical lead 20 to be protected can also be determined very accurately. Therefore, an indirect temperature measurement principle is implemented wherein $\Delta T_{sensor}$ serves as a measure for the heating up of the electrical lead 20. The temperature comparison value, which is used in the limitation unit 50, can therefore be determined in advance, by means of which a particularly simple and inexpensive limitation unit 50 in the form of a comparison unit can be used.

Furthermore, the thermal matching between the conductor path 40 and the electrical lead 20 can be achieved by appropriate dimensions and/or heat capacity of the conductor path or electrical lead. For example, one can choose for the conductor path a material that has a heat capacity comparable to that of the electrical lead so that a comparable or directly related heat input due to ohmic losses is produced. This thermal matching can alternatively or additionally also be implemented by appropriate dimensioning so that the diameter of the electrical lead and the width of the conductor path, for example, can be chosen so that ohmic losses are respectively produced which are in a previously set ratio.

Figure 2:
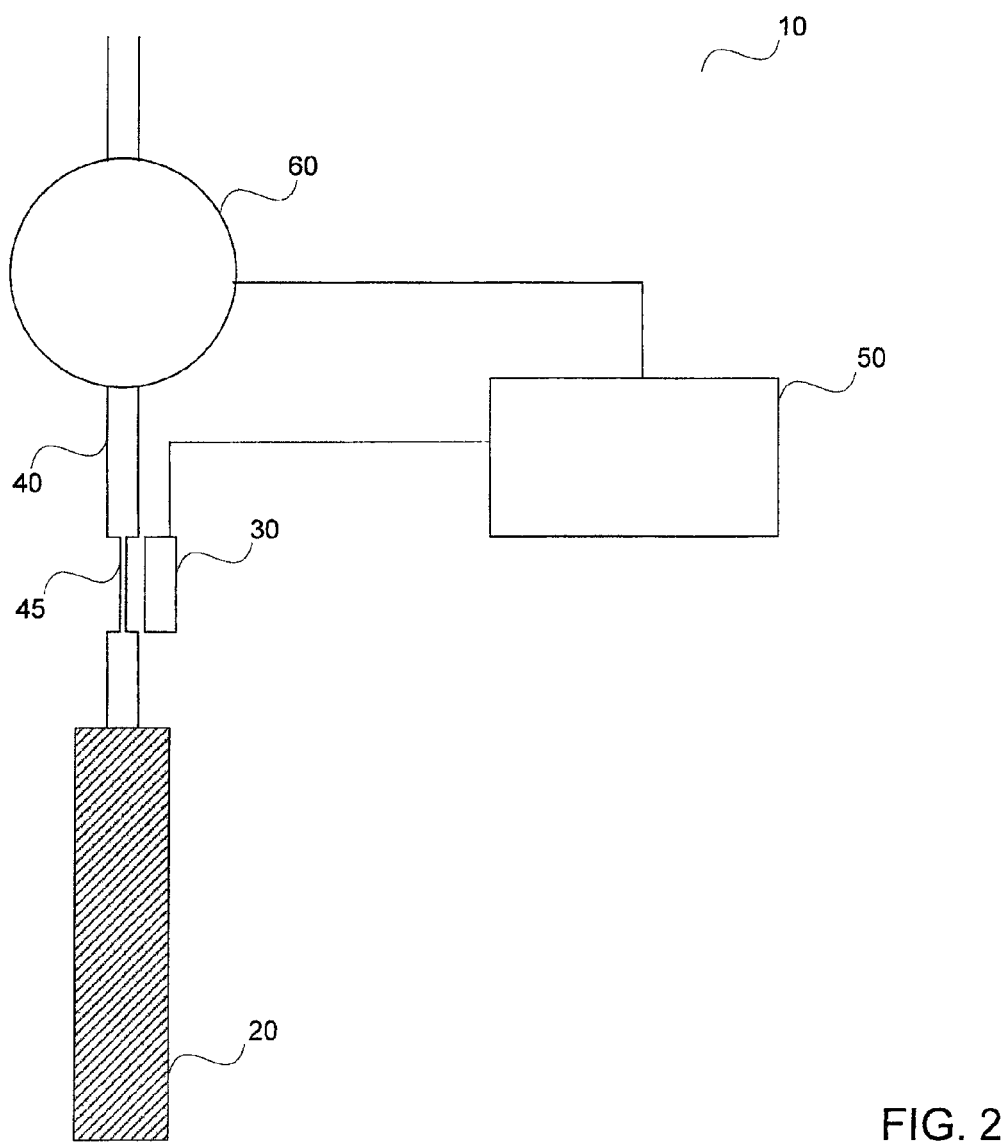
FIG. 2 shows schematically an apparatus for the protection of an electrical lead in a vehicle according to a further embodiment.

FIG. 2 shows a further preferred embodiment of the apparatus for the protection of an electrical lead wherein the conductor path 40 has a section 45 with dimensions which are tapered in comparison to the dimensions of the electric conductor 20. The protection principle of this preferred embodiment is that it is not a current of the electrical lead, but the heating at the constriction of the conductor path 40 that is measured in order to determine the lead temperature. If the thermal capacity of the apparatus carrier, e.g. of a metal core board, is chosen here to be similar to that of the electrical lead to be protected, the heat discharge is also comparable, and so one can arrive at an accurate conclusion regarding the temperature of the electrical lead by means of the measured temperature of the constriction.

The narrower the taper of the electric conductor path 40 on the tapered section 45 here, the smaller the contact surface of the conductor path with the apparatus carrier, i.e. the printed circuit board, so that the temperature discharge of the heat input generated by ohmic losses in the conductor path into the printed circuit board is reduced, and so can be matched to the comparably high heat capacity of the electrical lead 20.

Moreover, the tapered section 45 of the electric conductor path can additionally serve as an effective safety fuse so that in particular if the switch 60 malfunctions and does not limit the current flow through the electrical lead despite a corresponding instruction, or the limitation unit 50 malfunctions, a current flow through the electric conductor is cut off by melting the tapered section of the conductor path. Therefore one only needs to change the printed circuit board that has the apparatus 10.

Figure 3:
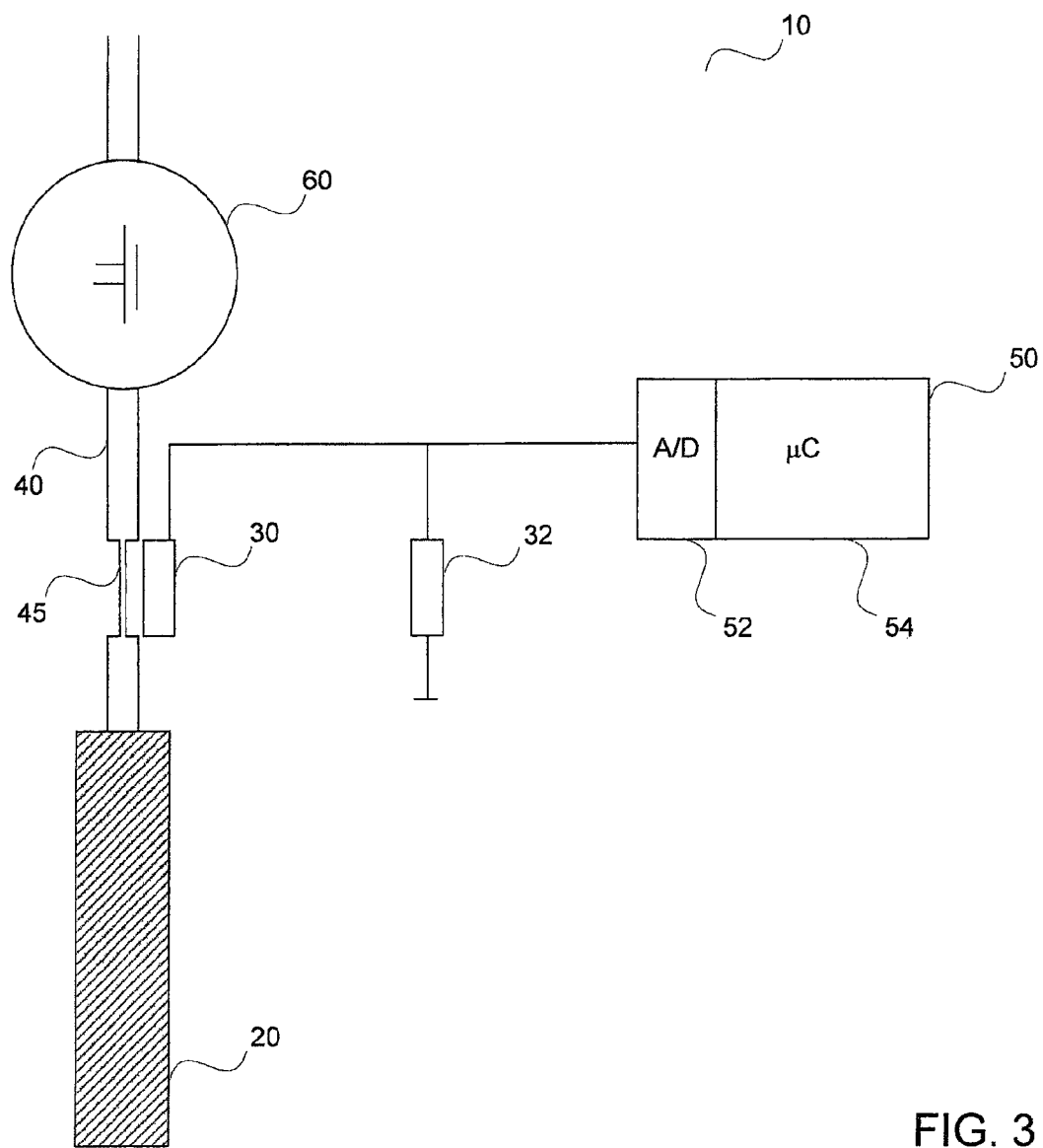
FIG. 3 shows schematically an apparatus for the protection of an electrical lead in a vehicle according to a further embodiment.

FIG. 3 shows a further preferred embodiment of the apparatus 10 for the protection of an electrical lead according to any of the preceding claims, the temperature sensor 30 being a temperature-dependent resistor, in particular a NTC (Negative Temperature Coefficient) or PTC (Positive Temperature Coefficient) resistor that is in thermal contact with the conductor path 40, in particular in the tapered section 45 of the conductor path. The thermal contact can be provided here by directly soldering the temperature-dependent resistor onto the conductor path 40, and this leads to a particularly good thermal contact, and so to particularly good thermal coupling between the temperature sensor and the constriction of the conductor path. Of course, other forms of thermal contact between the conductor path and the temperature-dependent resistor 30 are also possible.

As also shown in FIG. 3, the temperature-dependent resistor 30 is part of a voltage divider that has a further resistor 32 connected to earth. Furthermore, the temperature-dependent resistor 30 is preferably electrically connected to the conductor path 45, for example in the tapered region of the conductor path.

According to FIG. 3 the apparatus is furthermore designed such that a voltage value between the temperature-resistant resistor 30 and the further resistor 32 of the voltage divider is delivered to the limitation unit 50. For example, the temperature-dependent resistor 30 in FIG. 3 can have a resistance in the order of magnitude of 1 k$\Omega$ to 100 k$\Omega$, for example of 47 k$\Omega$, so that by appropriately choosing the further resistor 32 connected to earth at the limitation unit 50 variations in voltage due to temperature in the range from 0 to 2.5V occur.

The voltage value detected, which is thus tapped at the voltage divider and is present at the limitation unit 50, can be compared in a comparison unit of the limitation unit 50 with a previously determined voltage value. This detected voltage value corresponds indirectly to a temperature value in the conductor path 40, due to which the voltage value and the temperature value have an equivalence. Thus one can come to a conclusion regarding a temperature value in the electrical lead 20 to be protected from the detected voltage value. If therefore the detected voltage value exceeds a previously determined voltage value, this corresponds to a situation in which by means of the heat input due to ohmic losses the electric conductor has a triggering temperature at which protection of the electrical lead is to be implemented. If therefore the comparison unit establishes that this predetermined voltage value is exceeded, the limitation unit sends a signal to the switch 60 to limit or totally cut off the flow of current through the electric conductor.

The switch 60 is preferably a power MOSFET here that can be controlled by the limitation unit and which can be closed and opened in response to the signal from the limitation unit 50, i.e. by applying an appropriate gate voltage, and so can limit the supply of current through the electrical lead 20.

The above second state of the switching element 60 corresponds to an opened power MOSFET so that the electrical resistance in this second state is so great that practically no current flows through the electrical lead 20. The above first state corresponds to a closed power MOSFET with a small electrical resistance.

Furthermore, the apparatus according to this preferred embodiment is designed to close the power MOSFET again when the detected voltage value falls below the previously determined voltage value again and so a situation is detected in which the triggering temperature in the electrical lead 20 is fallen short of again. Therefore, automated protection of the electrical lead takes place so that without any external intervention the electric current supply of the on-board power supply is fully functional again as soon as the electrical lead once again has a temperature which is below the triggering temperature.

According to a further embodiment the limitation unit according to FIG. 3 can further comprise an A/D converter 52 which receives a signal from the temperature sensor 30 and converts it into a digital signal for the limitation unit 50. In particular, the A/D converter can convert a voltage signal of the voltage divider into a digital signal and deliver it to a microcontroller 54 of the limitation unit 50.

The microcontroller 54 can carry out a comparison operation here to compare the digital value with the predetermined value according to the comparison unit described above. However, the microcontroller 54 can furthermore have a functionality with which the temperature in the conductor path 40 and/or in the electrical lead can be determined from the detected digital voltage or temperature value of the temperature sensor 30. Here the microcontroller 54 can in particular take into account different material constants and/or dimensions of different electric conductors in a vehicle and the conductor path.

According to a further embodiment the conductor path is a conductor path printed onto a board. Furthermore, in addition to the board, the limitation unit and/or the switch and/or the temperature sensor can also be fastened to the board by plugging in and/or soldering or by applying in some other way. Thus, the apparatus can be provided as a compact apparatus, in particular as an electric load switch with a protection function for protecting one or more electrical leads. By providing these on the same board, the thermal properties of the individual elements in particular influence one another, and so it is made possible to determine the temperature of the electric conductor indirectly, but very accurately. The electric load switch, based on a few advantageous components and semiconductor elements offers, moreover, the advantage of clearly reduced noise in comparison to mechanical load switches.

Figure 4:
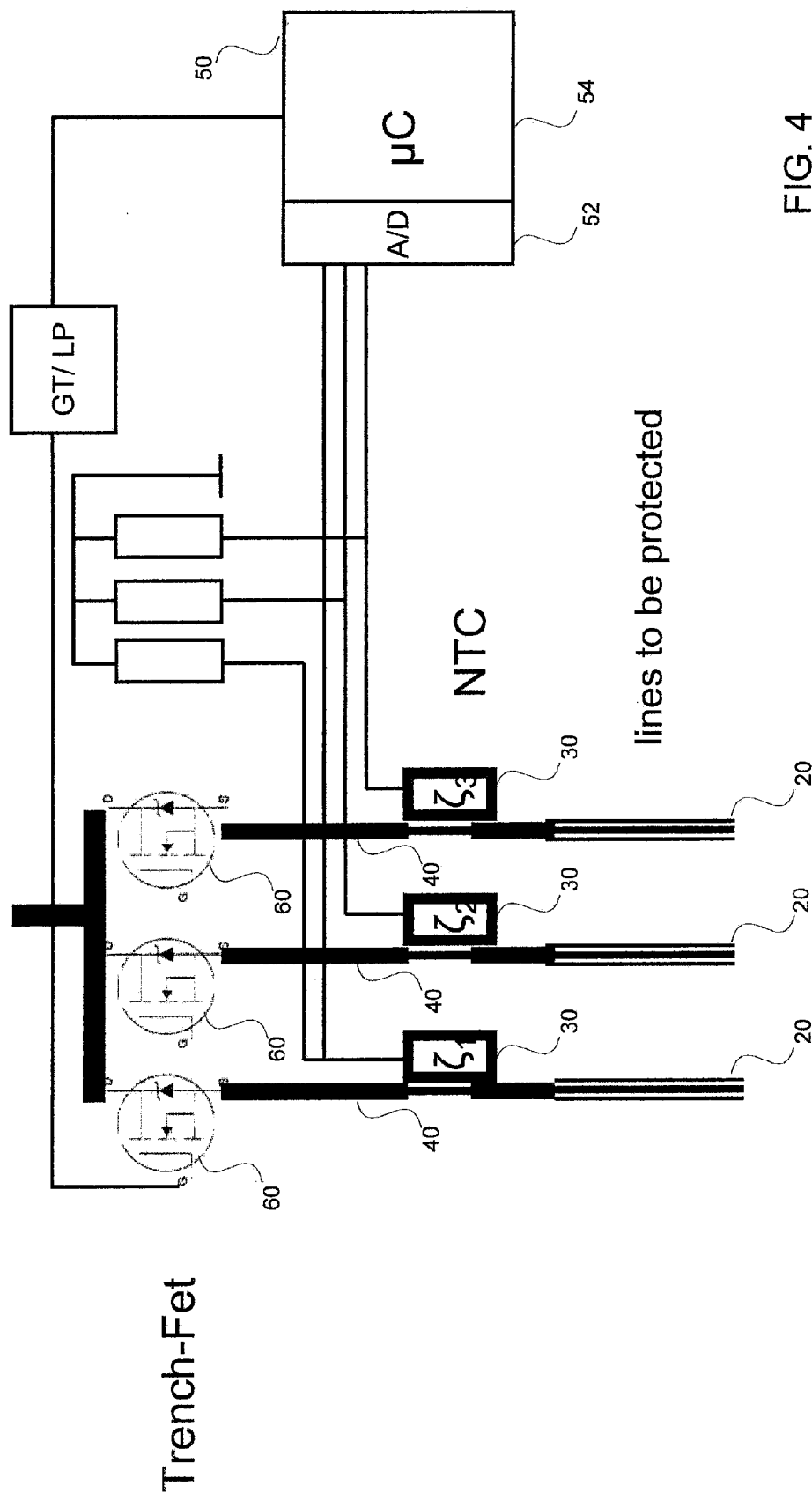
FIG. 4 shows schematically an apparatus for the protection of an electrical lead, in particular an electric load switch with trench FET in a vehicle according to a further embodiment.

FIG. 4 shows a further preferred embodiment comprising an apparatus, preferably a trench FET, for the protection of three leads 20 to be protected, three temperature sensors 30 which are respectively in the form of temperature-dependent resistors and can be connected by a voltage divider to a limitation unit, and three switches 60 which can be connected collectively to a supply voltage of the vehicle (12V battery, 48V battery, high voltage battery).

The limitation unit in FIG. 4 has an A/D converter 52 and a microcontroller 54, the A/D converter 52 converting the respective voltage values into corresponding digital voltage values and delivering them to the microcontroller 54. The microcontroller 54 has a comparator functionality for comparing the corresponding digital signals with respective previously determined values for the respective leads to be protected so that, according to the mode of operation described above, one or more of the electrical leads 20 can be protected.

Therefore, this preferred embodiment uses comparably inexpensive NTC or PTC temperature sensors 30 which can be connected directly to the A/D converter 52 or to the comparator input of the microcontroller 54. Therefore no expensive differential amplifiers are required for protection of the electrical lead. Of course a differential amplifier or some other comparator can also be used as the limitation unit 50, instead of or together with a microcontroller, and which for example carries out a threshold comparison and opens or closes the switch depending on the result.

Furthermore, with a hard short-circuit, with which high currents are established very quickly, the trench FET can withstand peak currents of several 100A if the semiconductor of the power MOSFET is thermally securely fastened to a printed circuit board and the thermal transfer resistance Rth_Junction_Case is very small. Therefore, the power MOSFET can carry this short-circuit current until after approx. 2 ms the microcontroller switches off the power MOSFET.

Figure 5:
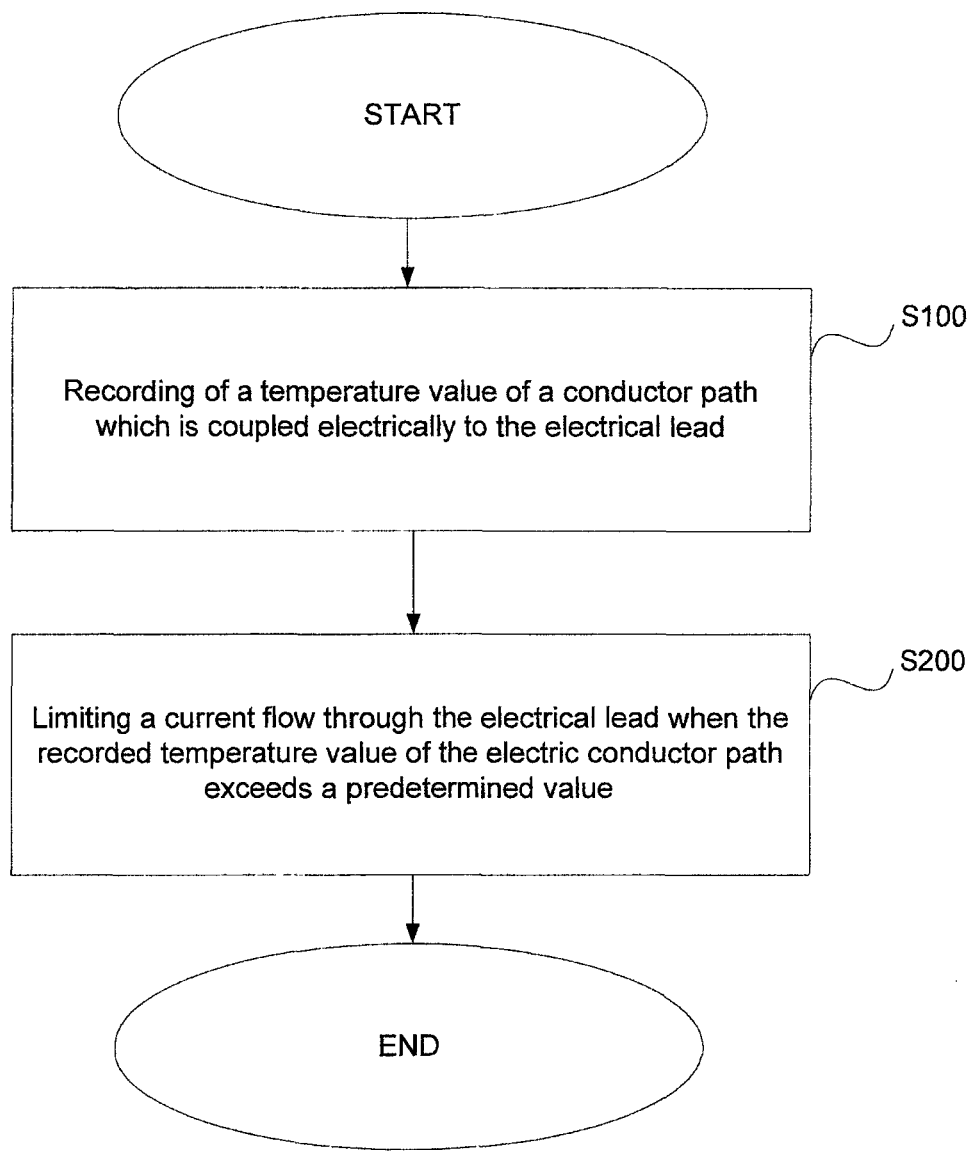
FIG. 5 shows a flow chart that shows the steps of a method for the protection of an electrical lead in a vehicle according to a further embodiment.

FIG. 5 shows a flow chart showing the steps of a method for the protection of an electrical lead in a vehicle according to a further embodiment. Here, in a first step S100, a temperature value of the conductor path which is electrically coupled to the electrical lead is detected. As explained above, this can be determined by a temperature-dependent resistance measurement on the conductor path, in particular at a restriction of the conductor path. In a second step S200 the flow of current through the electrical lead is limited when the detected temperature value of the electric conductor path exceeds a predetermined value.

From the description given above the person skilled in the art can see that different modifications and variations of the apparatus and of the method of the invention can be implemented without straying from the scope of the invention.

Furthermore, the present invention has been described with reference to specific examples which are only intended, however, to provide better understanding of the invention and are not intended to restrict the latter. Therefore, the true scope of the invention is characterized by the following claims.

The invention claimed is:

1. An apparatus for protecting an electrical lead in a vehicle comprising:
    a temperature sensor configured to detect a temperature value of a conductor path coupled electrically to the electrical lead, the conductor path having thermal characteristics substantially in conformance to the electrical lead; and
    a current limitation unit configured to limit a current flowing through the electrical lead when the temperature value of the conductor path exceeds a predetermined value.

2. The apparatus according to claim 1, wherein dimensions of the conductor path are substantially in conformance to dimensions of the electrical lead.

3. The apparatus according to claim 1, wherein the conductor path includes a section with dimensions tapered in comparison to dimensions of the electric lead.

4. The apparatus according to claim 1, wherein the temperature sensor includes a temperature-dependent resistor in thermal contact with the conductor path.

5. The apparatus according to claim 4, wherein:
    the temperature-dependent resistor is part of a voltage divider, the voltage dividing comprising a further resistor connected to ground,
    the temperature-dependent resistor is electrically connected to the conductor path, and
    a voltage value between the temperature-dependent resistor and the further resistor is conveyed to the current limitation unit.

6. The apparatus according to claim 1, further comprising:
    a switch limiting a power supply through the electrical lead in response to a signal from the current limitation unit when the temperature value of the conductor path exceeds the predetermined value.

7. The apparatus according to claim 6, wherein the current limitation unit further activates the switch such that the current flowing through the electrical lead is not further limited when the temperature value of the conductor path exceeds the predetermined value again.

8. The apparatus according to claim 1, further comprising:
    an A/D converter for detecting a signal from the temperature sensor and converting it into a digital signal for the current limitation unit.

9. The apparatus according to claim 1, the conductor path being a conductor path printed onto a board.

10. The apparatus according to claim 1, wherein the conductor path and the current limitation unit are formed on a board.

11. The apparatus according to claim 1, further comprising:
    a measuring apparatus provided over the conductor path in order to determine a drop in voltage.

12. An electric load switch with an electric protection function for protecting an electrical lead to consumers in a vehicle comprising:
    a board; and
    an apparatus according to claim 1.

13. A method for protecting an electrical lead in a vehicle comprising:
    detecting a temperature value of a conductor path coupled electrically to the electrical lead, the conductor path having thermal characteristics substantially in conformance to the electrical lead; and
    limiting a current flowing through the electrical lead when the temperature value of the electric conductor path exceeds a predetermined value.

14. The apparatus according to claim 1, wherein a heat capacity of the conductor path is substantially in conformance to a heat capacity of the electrical lead.

15. The apparatus according to claim 1, wherein a power loss of the conductor path is substantially in conformance to a power loss of the electrical lead.

16. The apparatus according to claim 6, wherein the switch is a power MOSFET.

17. The apparatus according to claim 6, wherein the current limitation unit further activates the switch such that the current flowing through the electrical lead is not further limited when a reset is implemented.

18. The apparatus according to claim 6, wherein the conductor path, the current limitation unit, and the switch are formed on a board.

* * * * *